United States Patent
Wu (10) Patent No.: US 10,777,147 B2
(45) Date of Patent: Sep. 15, 2020

(54) DISPLAY DEVICE AND CORRESPONDING REGIONAL DIMMING DRIVING METHOD

(71) Applicant: MStar Semiconductor, Inc., Hsinchu Hsien (TW)

(72) Inventor: Hui Wu, Shenzhen (CN)

(73) Assignee: MEDIATEK INC., Hsinchu (TW)

( * ) Notice: Subject to any disclaimer, the term of this patent is extended or adjusted under 35 U.S.C. 154(b) by 49 days.

(21) Appl. No.: 16/189,298

(22) Filed: Nov. 13, 2018

(65) Prior Publication Data

US 2019/0206335 A1    Jul. 4, 2019

(30) Foreign Application Priority Data

Dec. 29, 2017   (CN) .......................... 2017 1 1498772

(51) Int. Cl.
| | | |
|---|---|---|
| *G09G 5/10* | (2006.01) | |
| *G09G 3/34* | (2006.01) | |
| *G09G 3/20* | (2006.01) | |
| *G02F 1/13357* | (2006.01) | |

(52) U.S. Cl.
CPC ....... *G09G 3/342* (2013.01); *G02F 1/133603* (2013.01); *G09G 3/20* (2013.01); *G09G 2320/0247* (2013.01); *G09G 2320/062* (2013.01)

(58) Field of Classification Search
CPC .......................... G02F 1/133603; G09G 3/342
USPC ....................................................... 345/690
See application file for complete search history.

(56) References Cited

U.S. PATENT DOCUMENTS

| | | | |
|---|---|---|---|
| 8,736,543 B2 | 5/2014 | Kubota et al. | |
| 2011/0050743 A1* | 3/2011 | Park | G02F 1/133603 |
| | | | 345/690 |
| 2012/0092384 A1* | 4/2012 | Chang | G09G 3/342 |
| | | | 345/690 |
| 2016/0063929 A1 | 3/2016 | Huang et al. | |

FOREIGN PATENT DOCUMENTS

| | | |
|---|---|---|
| CN | 101281731 A | 10/2008 |
| CN | 101763830 A | 6/2010 |
| CN | 102262866 A | 11/2011 |
| CN | 103594061 A | 2/2014 |
| CN | 105047145 A | 11/2015 |

* cited by examiner

*Primary Examiner* — Abdul-Samad A Adediran
(74) *Attorney, Agent, or Firm* — McClure, Qualey & Rodack, LLP (57) ABSTRACT

A regional dimming driving method for a display device is provided. The display device includes multiple backlight sources respectively corresponding to multiple display regions of the display device. The regional dimming driving method includes acquiring a brightness value of each display region according to input image data, processing and adjusting the brightness value of each display region to acquire an adjusted brightness value of regional dimming of each display region, and respectively driving the backlight sources according to the adjusted brightness values of regional dimming of the corresponding display regions. By processing and adjusting the brightness values of the display regions, display effects can be effectively provided.

18 Claims, 10 Drawing Sheets

Perform backlight gamma curve adjustment on brightness value BL_cur2 of each display region to acquire adjusted brightness value BL_new2 of each display region — 51

DISPLAY DEVICE AND CORRESPONDING REGIONAL DIMMING DRIVING METHOD

This application claims the benefit of China application Serial No. 201711498772.2, filed Dec. 29, 2017, the subject matter of which is incorporated herein by reference.

BACKGROUND OF THE INVENTION

Field of the Invention

The invention relates to the field of display, and more particularly to a display device adopting regional dimming and a corresponding regional dimming driving method.

Description of the Related Art

With the development of technologies, display devices (e.g., liquid-crystal display (LCD)) with an image display function have become indispensable tool in daily work and lives of people.

In an LCD, multiple light-emitting diodes (LED) are usually used as backlight sources. Because LED backlight sources can be individually controlled according to positions required, these LED backlight sources in an LCD can be driven by adopting local dimming. That is, a display device can be divided into multiple display regions, and different LED backlight sources corresponding to different display regions are turned on at different brightness levels according to image data to be displayed, so as to achieve objects of enhancing contrast and reducing power consumption.

However, current local dimming suffers from the issues below. First of all, because the control frequency of an LED backlight source in local dimming is controlled by the frame rate of video data, the change in the brightness of the LED backlight source can be drastic if the change in brightness of consecutive frames in the video data is large, hence resulting in backlight flickering and poor display effects. Secondly, in local dimming, different LED backlight sources of different regions are individually controlled. Thus, a display region displaying a brighter image in image data corresponds to an LED backlight source having a higher backlight value, and a display region displaying a darker image in the image data corresponds to an LED backlight source having a lower backlight value. However, halo is likely formed at an intersection of bright and dark areas, and such halo aggravates as the difference in the brightness values of the display images increases, which also degrades display effects. Thirdly, the brightness of an entire image may be too low due to local dimming that reduces the overall backlight brightness, and thus brightness compensation is required. However, efficient brightness compensation can be quite challenging, and distortion in the overall image can be resulted in the event of inappropriate brightness compensation.

Therefore, there is a need for a regional dimming driving method and a corresponding display device for resolving the issues of local dimming of the prior art.

SUMMARY OF THE INVENTION

It is a primary object of the present invention to provide a regional dimming driving method and a display device to resolve the issues of the prior art and to obtain improved display effects.

To achieve the above object, the present invention provides a regional dimming driving method for a display device. The display device includes multiple backlight sources respectively corresponding to multiple display regions of the display device. The regional dimming driving method includes acquiring a brightness value of each display region according to input image data, processing and adjusting the brightness value of each display region to acquire an adjusted brightness value of regional dimming of each display region, and respectively driving the backlight sources according to the adjusted brightness values of regional dimming of the corresponding display regions.

To achieve the above object, the present invention provides a display device. The display device includes: multiple backlight sources, respectively corresponding to multiple display regions of the display device; a processor, reading input image data, acquiring a brightness value of each display region according to the input image data, and processing and adjusting the brightness value of each display region to acquire an adjusted brightness value of regional dimming of each display region; and a driving circuit, electrically connected to the processor and the multiple backlight sources, receiving the adjusted brightness values of regional dimming of the display regions outputted from the processor, and generating corresponding driving signals according to the adjusted brightness values of regional dimming of the display regions to respectively drive the corresponding backlight sources.

In the method, the step of processing and adjusting the brightness value of each display region includes luminance detection filter adjustment, including: acquiring a maximum brightness value and an average brightness value of a display image of each display region according to the image data; adjusting a weighting coefficient between the maximum brightness value and the average brightness value of the display image each of display region; and acquiring the adjusted brightness value of each display regional according to the maximum brightness value, the average brightness value and the weighting coefficient of each display region.

In the method, the step of processing and adjusting the brightness value of each display region includes temporal filter adjustment, including: acquiring a brightness value of a current frame corresponding to each display region; acquiring a brightness value of a previous frame corresponding to each display region; adjusting a weighting coefficient between the brightness value of the previous frame and the brightness value of the current frame corresponding to each display region; and acquiring the adjusted brightness value of each display region according to the brightness value of the current frame and the brightness value of the previous frame corresponding to the each display region and the weighting coefficient of the each display region.

When the brightness value of the current frame corresponding to the display region is greater than a predetermined threshold, the weighting coefficient is set to 0.

In the method, the step of processing and adjusting the brightness value of the each display region includes spatial filter adjustment, including: acquiring a brightness value of a central display region and a brightness value of a peripheral display region; and performing adjustment according to the brightness value of the central display region and the brightness value of the peripheral display region to acquire an adjusted brightness value of the central display region and an adjusted brightness value of the peripheral display region.

The step of performing adjustment according to the brightness value of the central display region and the brightness value of the peripheral display region to acquire the adjusted brightness value of the central display region and the adjusted brightness value of the peripheral display region further includes: determining whether the brightness value of the central display region is smaller than the brightness value of the peripheral display region; and when it is determined that the brightness value of the central display region is smaller than the brightness value of the peripheral display region, selecting, between the brightness value of the central display region and the brightness value of the peripheral display region, the one having a greater difference from a predetermined threshold, as the adjusted brightness value of the central display region; otherwise, when it is determined that the brightness value of the central display region is not smaller than the brightness value of the peripheral display region, keeping the brightness value of the central display region and the brightness value of the peripheral display region unchanged.

The step of performing adjustment according to the brightness value of the central display region and the brightness value of the peripheral display region to acquire the adjusted brightness value of the central display region and the adjusted brightness value of the peripheral display region further includes: determining whether the brightness value of the central display region is greater than the brightness value of the brightness value of the peripheral display region; and when it is determined that the brightness value of the central display region is greater than the brightness value of the peripheral display region, acquiring a weighting coefficient between the brightness value of the central display region and the brightness value of the peripheral display region, and acquiring the adjusted brightness value of the peripheral display region according to the brightness value of the peripheral display region, the brightness value of the central display region and the weighting coefficient; otherwise, when it is determined that the brightness value of the central display region is not greater than the brightness value of the peripheral display region, keeping the brightness value of the peripheral display region around the central display region unchanged.

In the method, the step of processing and adjusting the brightness value of each display region includes backlight gamma adjustment, including: performing backlight gamma adjustment on the brightness value of each display region to acquire the adjusted brightness value of each display region.

In the method, the step of processing and adjusting the brightness value of each display region includes local dimming strength adjustment, including:
adjusting a local dimming factor of the display device; and acquiring the adjusted brightness value of each display region according to the brightness value of each display region, the local dimming factor and a maximum brightness value of the backlight source.

In the method, the step of processing and adjusting the brightness value of each display region includes global dimming strength adjustment, including: adjusting a backlight factor of the display device; and acquiring the adjusted brightness value of each display region according to the brightness value of each display region and the backlight factor.

The present invention provides the following effects. Different from the prior art, in the regional dimming driving method and the display device of the present invention, after the brightness value of each display region is acquired according to input image data, further adjustment and processing are performed on the brightness value of each display region according to requirements, for example, one or more of luminance detection filter adjustment, temporal filter adjustment, spatial filter adjustment, backlight gamma adjustment, local dimming strength adjustment and global dimming strength adjustment. With the associated adjustment and processing, issues of backlight flickering and halo can be effectively resolved and brightness compensation can be appropriately performed, thereby providing improved display effects.

The above and other aspects of the invention will become better understood with regard to the following detailed description of the preferred but non-limiting embodiments. The following description is made with reference to the accompanying drawings.

DETAILED DESCRIPTION OF THE INVENTION

Specific details of the present invention are given in the description below to thoroughly understand the present invention. However, the present invention can be implemented by other methods different from those described below, and a person skilled in the art can make similar arrangements on the basis of the disclosure below without departing from the spirit of the present invention. That is, the present invention is not limited to the disclosure of the embodiments below.

In view of the foregoing issues of the prior art, the present invention provides a regional dimming driving method and a corresponding display device. Details of the present invention are given in the embodiments with the accompanying drawings below.

Figure 1:
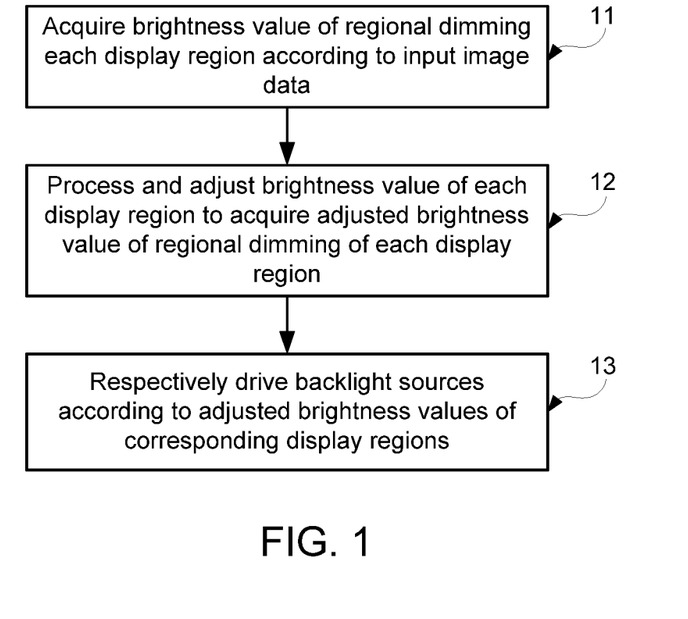
FIG. 1 is a flowchart of a regional dimming driving method for a display device according to an embodiment of the present invention.

FIG. 1 shows a flowchart of a regional dimming driving method for a display device according to an embodiment of the present invention. As shown in FIG. 1, the regional dimming driving method of the embodiment is applied to a display device having multiple backlight sources, wherein the multiple backlight sources respectively correspond to multiple display regions of the display device and may be implemented by light-emitting diodes (LED). The regional dimming driving method according to the embodiment of the present invention includes the following steps.

In step 11, a brightness value of regional dimming of each display region is acquired according to input image data.

In step 12, the brightness value of each display region is processed and adjusted to acquire an adjusted brightness value of regional dimming of each display region.

In step 13, the backlight sources are respectively driven according to the brightness value of regional dimming of corresponding display regions.

That is to say, in the present invention, after image data is received and the brightness value corresponding to each display region is acquired according to the image data, the brightness value corresponding to each display region is further processed and adjusted. During the adjustment process, issues of current local dimming are individually processed, and the backlight sources are then respectively driven according to the adjusted brightness values corresponding to the display regions.

In the present invention, the step of further processing and adjusting the brightness value corresponding to each display region includes luminance detection filter (LDF) adjustment, temporal filter (TF) adjustment, spatial filter (SF) adjustment, backlight gamma (BLG) adjustment, local dimming strength adjustment and global dimming strength (GDS) adjustment. In the embodiment of the present invention, the step of further processing and adjusting the brightness value corresponding to each display region may include all of the types of adjustment above, which may be sequentially performed according to a predetermined order. It can be understood by a person skilled in the art that, in the present invention, the step of further processing and adjusting the brightness value corresponding to each display region can include only one or some types of the adjustment above.

Figure 2:
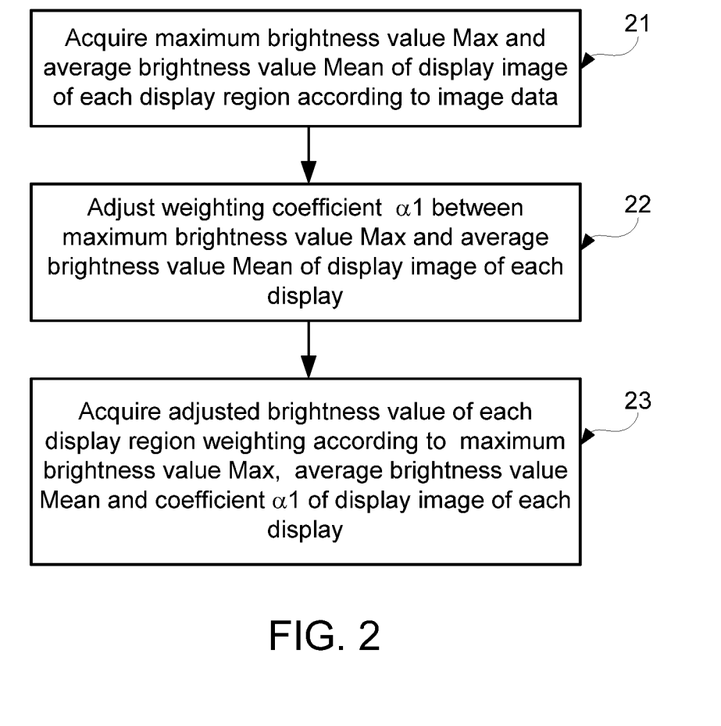
FIG. 2 is a specific flowchart of luminance detection filter adjustment of step 12 shown in FIG. 1.

FIG. 2 shows a specific flowchart of luminance detection filter adjustment of step 12 shown in FIG. 1. As shown in FIG. 12, when the step of processing and adjusting the brightness value of each display region includes luminance detection filter adjustment, step 12 includes the following steps.

In step 21, a maximum brightness value Max and an average brightness value Mean of a display image of each display region are acquired according to the image data.

In step 22, a weighting coefficient $\alpha 1$ between the maximum brightness value Max and the average brightness value Mean of the display image of each display region is adjusted.

In step 23, the adjusted brightness value of each display region is acquired according to the maximum brightness value Max, the average brightness value Mean and the weighting coefficient $\alpha 1$ of the display image of each display region.

That is to say, during luminance detection filter adjustment, a processor in the display device obtains the maximum brightness value Max and the average brightness value Mean of the display image corresponding to each display region according to the input image data, sets an adjustment coefficient $\beta 1$, and accordingly adjusts the weighting coefficient $\alpha 1$ between the maximum brightness value Max and the average brightness value Mean of the display image of each display region. The value of weighting coefficient $\alpha 1$ is determined from the range $[0, \beta 1]$, and the adjusted brightness value BL of each display region is calculated according to an equation $BL=[\alpha 1 * Max + (\beta 1 - \alpha 1) * Mean]/\beta 1$, where the adjustment coefficient $\beta 1$ may be any random integer greater than 0. In this embodiment, the adjustment coefficient $\beta 1$ can be correspondingly set according to the precision of brightness data of the display device. For example, if the brightness value of the display device corresponds to N-bit binary data, the adjustment coefficient $\beta 1$ may be set to 2N. A person skilled in the art can understand that the adjustment coefficient $\beta 1$ may also be set by adopting other methods.

A person skilled in the art can understand that, when a difference between the maximum brightness value Max and the average brightness value Mean of the display image of any display region is large, the determined value of the weighting coefficient $\alpha 1$ is also large; alternatively, when the number of pixels having the maximum brightness value Max or the number of pixels having a brightness value close to the maximum brightness value Max included in a display image corresponding to any display region is large, the determined value of the weighting coefficient $\alpha 1$ can also be a large value. As the determined value of the weighting coefficient $\alpha 1$ increases, the brightness of the corresponding region gets higher and the contrast in brightness corresponding to the display image also becomes more significant; as he determined value of the weighting coefficient $\alpha 1$ decreases, the brightness of the corresponding region gets lower and the contrast in brightness corresponding to the display image also becomes less significant.

Further, if the processor in the display device can acquire only the maximum brightness value Max of the display image instead of simultaneously acquiring the maximum brightness value Max and the average brightness value Mean of the display image corresponding to each display region, the weighting coefficient $\alpha 1$ is set to equal to the adjustment coefficient $\beta 1$, that is, $\alpha 1 = \beta 1$; if the processor can acquire only the average brightness value Mean of the display image, the weighting coefficient $\alpha 1$ is set to equal to 0, that is, $\alpha 1 = 0$.

Thus, through luminance detection filter adjustment, given that the backlight and contrast adjustment function is maintained, the regional dimming of the present invention is capable of further enhancing the brightness value of each display region, effectively performing brightness compensation on the entire frame.

Figure 3:
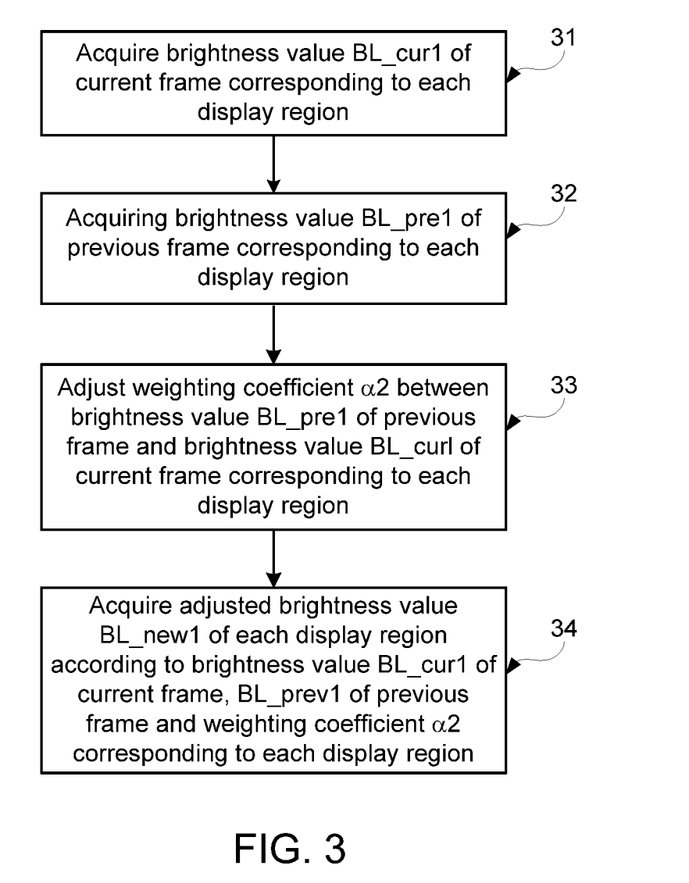
FIG. 3 is a specific flowchart of temporal filter adjustment of step 12 shown in FIG. 1.

FIG. 3 shows a specific flowchart of temporal filter adjustment of step 12 shown in FIG. 1. As shown in FIG. 3, when the step of processing and adjusting the brightness value of each display region includes temporal filter adjustment, step 12 includes the following steps.

In step 31, a brightness value BL_cur1 of a current frame corresponding to each display region is acquired.

In step 32, a brightness value BL_pre1 of a previous frame corresponding to each display region is acquired.

In step 33, a weighting coefficient $\alpha 2$ between the brightness value BL_pre1 of the previous frame and the brightness value BL_cur1 of the current frame corresponding to each display region is adjusted.

In step 34, an adjusted brightness value BL_new1 of each display region is acquired according to the brightness value BL_cur1 of the current frame, the brightness value BL_pre1 of the previous frame, and the weighting coefficient $\alpha 2$ corresponding to each display region.

That is to say, during temporal filter adjustment, in addition to the brightness value BL_cur1 of the current frame corresponding to each display region, the brightness value BL_pre1 of the corresponding previous frame is further taken into account; an adjustment coefficient $\beta 2$ is the set according to the precision of the brightness value data, and the weighting coefficient $\alpha 2$ between the brightness value BL_pre1 of the previous frame and the brightness value BL_cur1 of the current frame corresponding to each display region is then adjusted. The value of the weighting coefficient α2 is determined from the range [0, β2], and the adjusted brightness value BL_new1 of each display region is then calculated according to an equation $$BL\_new1 = [\alpha 2 * BL\_pre1 + (\beta 2 - \alpha 2) * BL\_cur1/\beta 2.$$

In the embodiment of the present invention, when the brightness value BL_cur1 of the current frame corresponding to any display region is greater than the brightness value BL_pre1 of the previous frame, that is, the image becomes brighter, the determined value of the weighting coefficient α2 at this point is smaller and the display image becomes brighter at a faster speed; conversely, when the brightness value BL_cur1 of the current frame corresponding to any display region is smaller than the brightness value BL_pre1 of the previous frame, that is, the display image gets darker, the determined value of the weighting coefficient α2 at this point is larger and the display image becomes darker at a slower speed.

Figure 4:
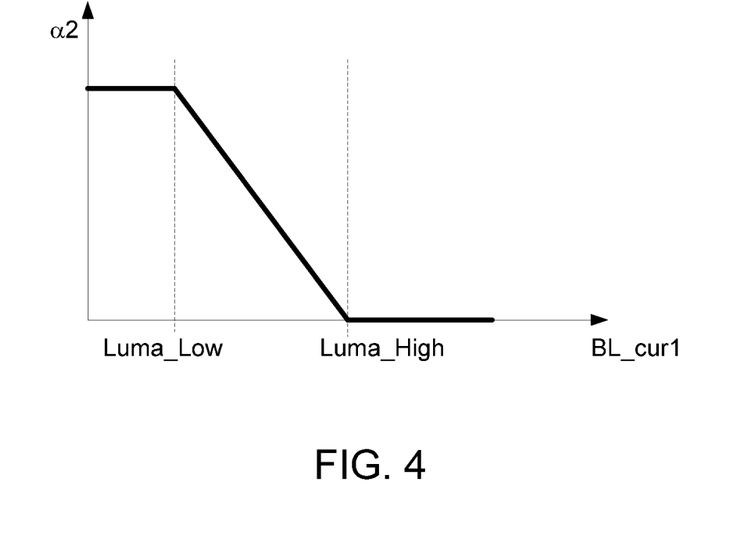
FIG. 4 is a schematic diagram of the change in a weighting coefficient in temporal filter adjustment along with a brightness value of a current frame of a display region.

FIG. 4 shows a schematic diagram of the change in the weighting coefficient α2 along with the brightness value BL_cur1 of the current frame of a display region in temporal filter adjustment. As shown in FIG. 4, when the brightness value BL_cur1 of the current frame of the display region is smaller than a defined minimum brightness threshold Luma_Low, the determined value of the weighting coefficient α2 may be set to a constant value; when the brightness value BL_cur1 of the current frame of the display region is greater than the minimum brightness threshold Luma_Low, the weighting coefficient α2 gradually decreases as the brightness value BL_cur1 of the current frame increases, and the weighting coefficient α2 at this point is not set to a constant value for the reason that such constant value may cause untimely response in the brightness of a video image in certain scenarios. Particularly, for an image that changes from being dark to being bright, backlight sources need to respond timely, and associated images may appear darker if the backlight sources fail to timely achieve sufficient brightness. Further, it should be noted that, when the brightness value BL_cur1 of the current frame of the display region reaches a predetermined threshold Luma_High, the weighting coefficient α2 is set to 0. That is to say, when the brightness value BL_cur1 of the current frame of the display region needs to be in a higher value, the corresponding backlight sources are required to timely light up and provide sufficient backlight brightness, and thus the temporal filter adjustment should be turned off at this point, i.e., setting the weighting coefficient α2 to 0, and a combination of the brightness value BL_pre1 of the previous frame is no longer considered, so as to enable the corresponding backlight sources to timely respond to provide a response brightness value.

Thus, through temporal filter adjustment, the regional dimming of the present invention considers the brightness value BL_cur1 of the current frame as well as the brightness value BL_pre1 of the previous frame corresponding to each display region, and performs combination according to the brightness value BL_cur1 of the current frame and the brightness value BL_pre1 of the previous frame corresponding to each display region to acquire the adjusted brightness value BL_new1 of each display region. That is to say, the temporal filter adjustment of the present invention controls the change in backlight brightness of consecutive video frames according to time sequences to prevent the issue of a drastic brightness change in consecutive frames, thereby effectively resolving the issue of backlight flickering.

Figure 5:
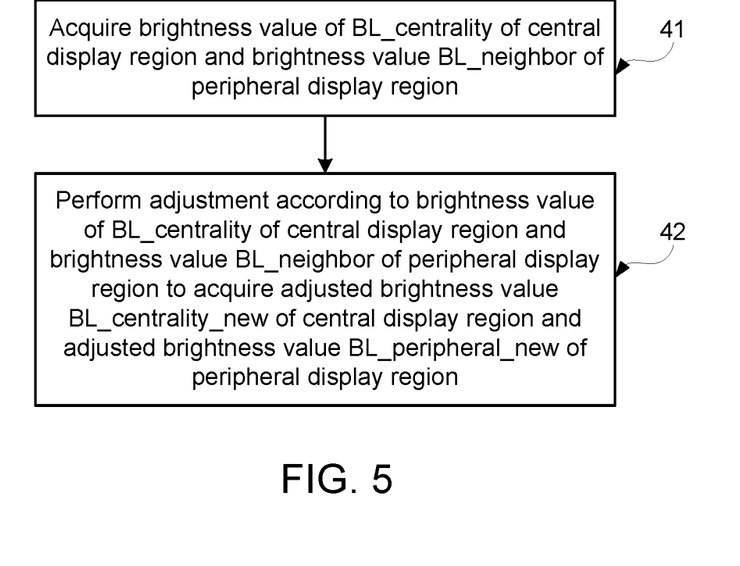
FIG. 5 is a specific flowchart of spatial filter adjustment of step 12 shown in FIG. 1.
Figure 6:
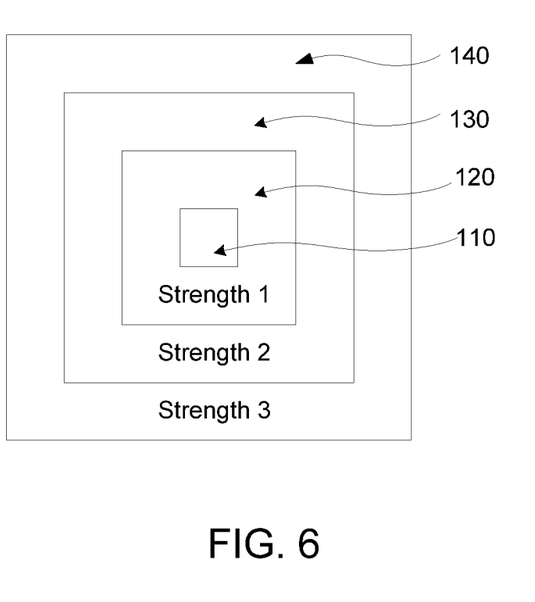
FIG. 6 is a schematic diagram of spatial light intensity of a backlight source.

FIG. 5 shows a specific flowchart of spatial filter adjustment of step S12 shown in FIG. 1. FIG. 6 shows a schematic diagram of spatial light intensity of a backlight source. As shown in FIG. 6, generally when a display image is displayed, the brightness value at a central region 110 is the highest, the brightness value of a first peripheral region 120 around the central region 110 is slightly smaller (e.g., the brightness value of the first peripheral region 120 is smaller than the brightness value of the central region 110 by strength 1), the brightness value of a second peripheral region 130 around the first peripheral region 120 is further slightly smaller (e.g., the brightness value of the second peripheral region 130 is smaller than the brightness value of the first peripheral region 120 by strength 2), the brightness value of a third peripheral region 140 around the second peripheral region 130 is further slightly smaller (e.g., the brightness value of the third peripheral region 140 is smaller than the second peripheral region 130 by strength 3), and so forth, thus forming the schematic diagram of spatial light intensity of a backlight source shown in FIG. 6. In the embodiment of the present invention, three peripheral regions 120, 130 and 140 around the central region 110 are depicted. A person skilled in the art can understand that, the number of the peripheral regions can be configured according to actual requirements (e.g., the number of LED backlight sources).

Referring to FIG. 5, when the step of processing and adjusting the brightness value of each display region includes spatial filter adjustment, step 12 includes the following steps.

In step 41, a brightness value BL_centrality of a central display region and a brightness value BL_neighbor region of a peripheral display region are acquired.

In step 42, adjustment is performed according to the brightness value BL_centrality of the central display region and the brightness value BL_neighbor region of the peripheral display region to acquire an adjusted brightness value BL_centrality_new of the central display region and an adjusted brightness value BL_neighbor_new of the peripheral display region.

Figure 7:
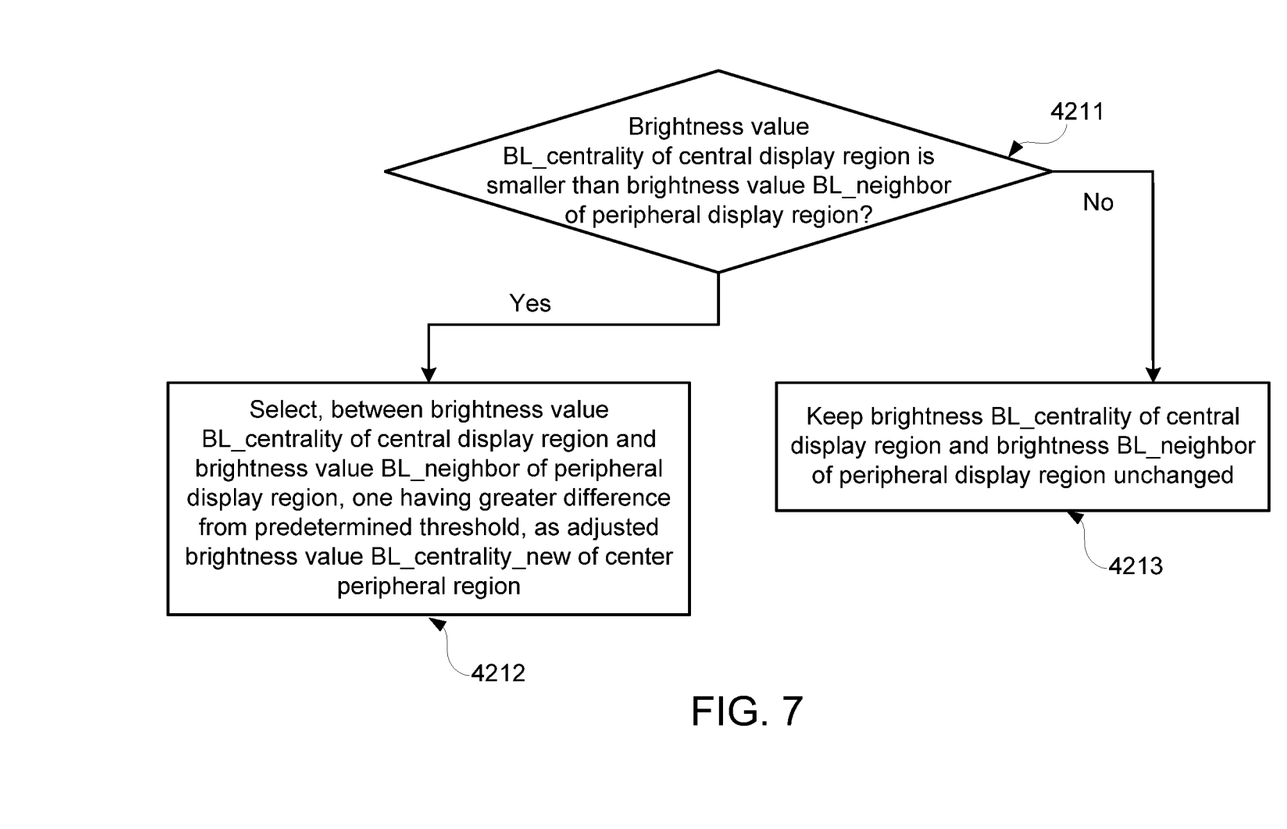
FIG. 7 is a specific flowchart of step 42 shown in FIG. 5 according to an embodiment of the present invention.

In the present invention, two methods are provided for performing spatial filter adjustment. FIG. 7 shows step 42 shown in FIG. 5 according to an embodiment of the present invention. As shown in FIG. 6, in this embodiment, step 42 further includes the following steps.

In step 4211, it is determined whether the brightness value BL_centrality of the central display region is smaller than the brightness value BL_neighbor of the peripheral display region.

In step 4212, when it is determined that the brightness value BL_centrality of the central display region is smaller than the brightness value BL_neighbor of the peripheral display region, between the brightness value BL_centrality of the central display region and the brightness value BL_neighbor of the peripheral display region, the one having a greater difference from a predetermined threshold is selected as the adjusted brightness value BL_centrality_new of the central display region.

In step 4213, conversely, when it is determined that the brightness value BL_centrality of the central display region is not smaller than the brightness value BL_neighbor of the peripheral display region, the brightness value BL_centrality of the central display region and the brightness value BL_neighbor of the peripheral display region are kept unchanged; that is, the brightness value BL_centrality of the central display region is continually used as the adjusted brightness value BL_centrality of the central display region, and the brightness value BL_neighbor of the peripheral display is continually used as the adjusted BL_neighbor_new of the peripheral display region.

For example, when the first display region is located at the central region 110 and the second region is located at the first peripheral region 120 in FIG. 5, it can be considered at this point that the first display region located at the central display region 110 is the central display region and the second display region located at the first peripheral region 120 is the peripheral display region. When the brightness value BL_centrality of the first display region is smaller than the brightness value BL_neighbor of the second display region, the adjusted brightness value BL_centrality_new of the first display region having undergone spatial filter adjustment is:

$$BL\_centrality\_new=max(BL\_centrality, BL\_neighbor-strength\ 1)$$

That is to say, depending on the difference between the brightness value BL_neighbor of the second display region and a predetermined threshold strength 1 (i.e., the brightness difference between the central region 110 and the first peripheral region 120), when this difference is greater than the brightness value BL_centrality of the first display region, the difference between the brightness value BL_neighbor of the second display region and the predetermined threshold strength 1 is used as the adjusted brightness value BL_centrality_new of the first display region; conversely, when the difference is smaller than the brightness value BL_centrality of the first display region, the brightness value BL_centrality of the first display region is continually used as the adjusted brightness value BL_centrality of the first display region.

Similarly, when the first display region is located at the third peripheral region 140 shown in FIG. 5 and the second display region is located at the second peripheral region 130 shown in FIG. 5, the second display region at this point is closer to the central region 110 shown in FIG. 5 than the first display region. Thus, at this point, it can be considered that the second display region is the central display region having the brightness value BL_centrality, and the first display region is the peripheral display region having the brightness BL_neighbor.

When the brightness value BL_centrality of the second display region is smaller than the brightness value BL_neighbor of the first display region, the adjusted brightness value BL_centrality_new of the second display region having undergone spatial filter adjustment is:

$$BL\_centrality\_new=max(BL\_centrality, BL\_neighbor-strength\ 3)$$

In this example, the predetermined threshold strength 3 is the brightness difference between the third peripheral region 140 and the second peripheral region 120 shown in FIG. 5. When the difference between the brightness value BL_neighbor of the first display region and the predetermined threshold strength 3 is further greater than the brightness value BL_centrality of the second display region, the brightness value of the second display region is adjusted to the difference between the brightness value BL_neighbor of the first display region and the predetermined threshold strength 3, i.e., BL_centrality_new=BL_neighbor−strength 3; conversely, when the difference between the brightness value BL_centrality of the first display region and the predetermined threshold strength 3 is smaller than the brightness value BL_centrality of the second display region, the brightness value of the second display region is kept unchanged, i.e., BL_centrality_new=BL_centrality.

Thus, in this embodiment, the brightness value of the central display region is adjusted through spatial filter adjustment, which adjusts the brightness value of the central display region with reference to the brightness value of the peripheral display region, hence effectively improving the issue of halo between a central display region and a peripheral display region.

Figure 8:
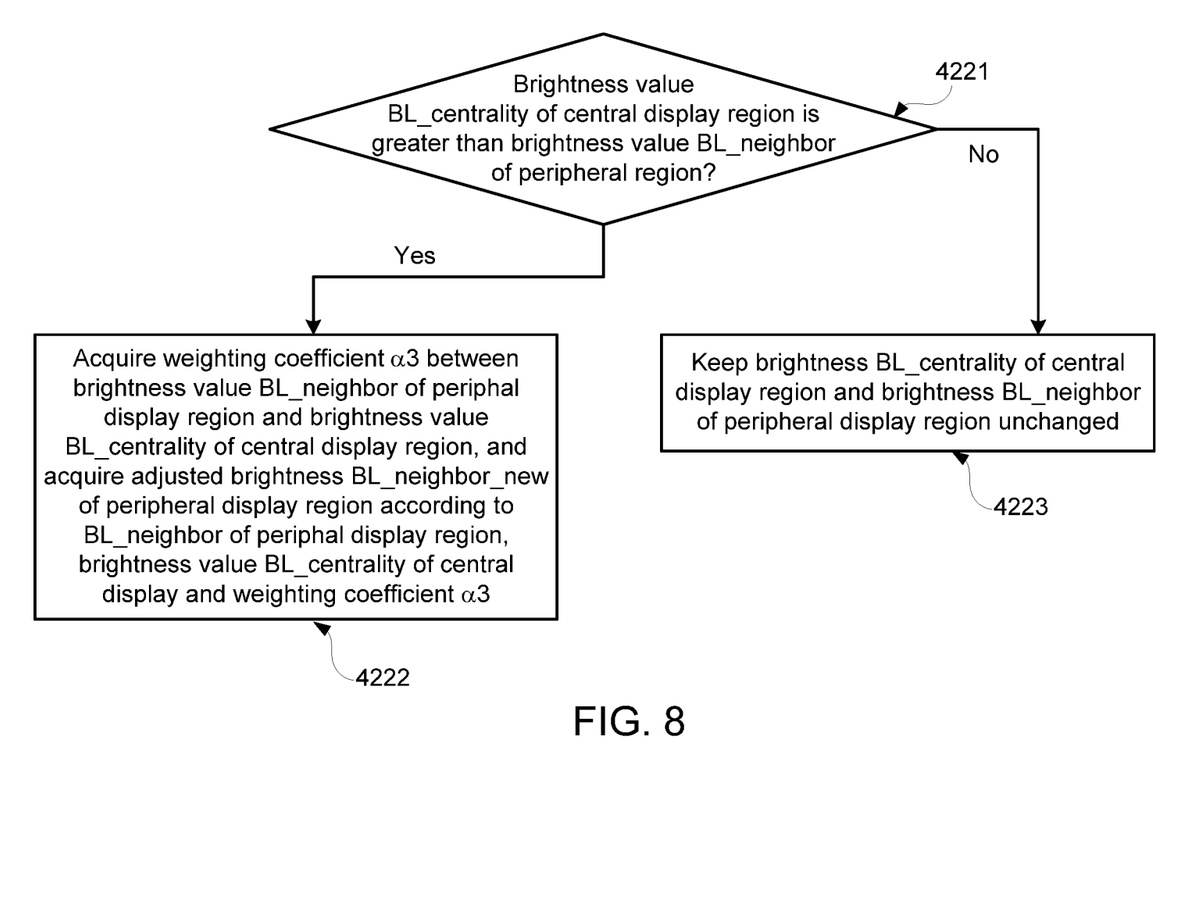
FIG. 8 is a specific flowchart of step 42 shown in FIG. 5 according to another embodiment of the present invention.

FIG. 8 shows a specific flowchart of step 42 shown in FIG. 5 according to another embodiment of the present invention. As shown in FIG. 8, in this embodiment, step 42 further includes the following steps.

In step 4221, it is determined whether the brightness value BL_centrality of the central display region is greater than the brightness value BL_neighbor of the peripheral display region.

In step 4222, when it is determined that the brightness value BL_centrality of the central display region is greater than the brightness BL_neighbor of the peripheral display region, a weighting coefficient α3 between the brightness value BL_centrality of the central display region and the brightness BL_neighbor of the peripheral display region is acquired, and the adjusted brightness value BL_neighbor_new of the peripheral display region is acquired according to the brightness value BL_neighbor of the peripheral display region, the brightness value BL_centrality of the central display region and the weighting coefficient α3.

More specifically, the weighting coefficient α3 between the brightness value BL_neighbor of the peripheral display region and the brightness value BL_centrality of the central display region can be acquired according to an equation below:

$$\alpha 3=(BL\_neighbor/BL\_centrality)*\beta 3$$

In the above, β3 is a platform effect factor, and can be pre-configured from any constant value ranging between [0, 1] according to a platform effect, and thus the value of the weighting coefficient α3 is also determined from the range [0, 1].

The adjusted brightness value BL_neighbor_new of the peripheral display region is acquired according to an equation below:

$$BL\_neighbor\_new=\alpha 3*BL\_centrality+(1-\alpha 3)*BL\_neighbor$$

In step 4223, conversely, when it is determined that the brightness value BL_centrality of the central display region is not greater than the brightness BL_neighbor of the peripheral display region, the brightness values of the central display region and the peripheral display region are kept unchanged; that is, the brightness value BL_centrality of the central display region is continually used as the adjusted brightness value BL_centrality_new of the central display region and the brightness value BL_neighbor of the peripheral display region is continually used as the adjusted brightness value BL_neighbor_new of the peripheral display region.

That is to say, in this embodiment, spatial filter adjusted is performed through adjusting the brightness value of the peripheral display region according to the brightness value of the central display region to effectively compensate the brightness value of the peripheral display region, thereby effectively improving the issue of halo between the central display region and the peripheral display region.

Thus, through spatial filter adjustment, regional dimming of the present invention effectively refers and compares brightness values of a central display region and a peripheral display region and accordingly performs associated adjustment, i.e., controlling a gradual changing effect of adjacent backlight sources from the perspective of space, thereby effectively resolving the issue of halo and achieving better display effects.

Figure 9:
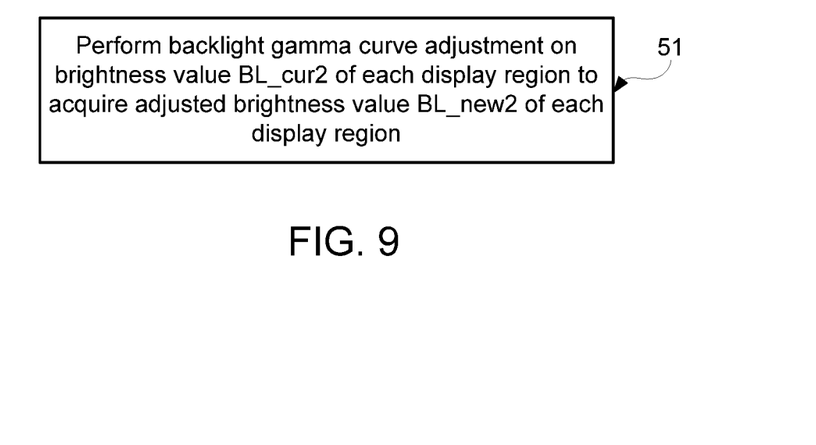
FIG. 9 is a specific flowchart of backlight gamma adjustment of step 12 shown in FIG. 1.

FIG. 9 shows a specific flowchart of backlight gamma adjustment of step 12 shown in FIG. 1. As shown in FIG. 9, when the step of processing and adjusting the brightness value of each display region includes backlight gamma adjustment, step 12 includes the following step.

In step 51, backlight gamma curve adjustment is performed on a brightness value BL_cur2 of each display region to acquire an adjusted brightness value BL_new2 of each display region; that is, BL_new2=Gamma[BL_cur2].

Figure 10:
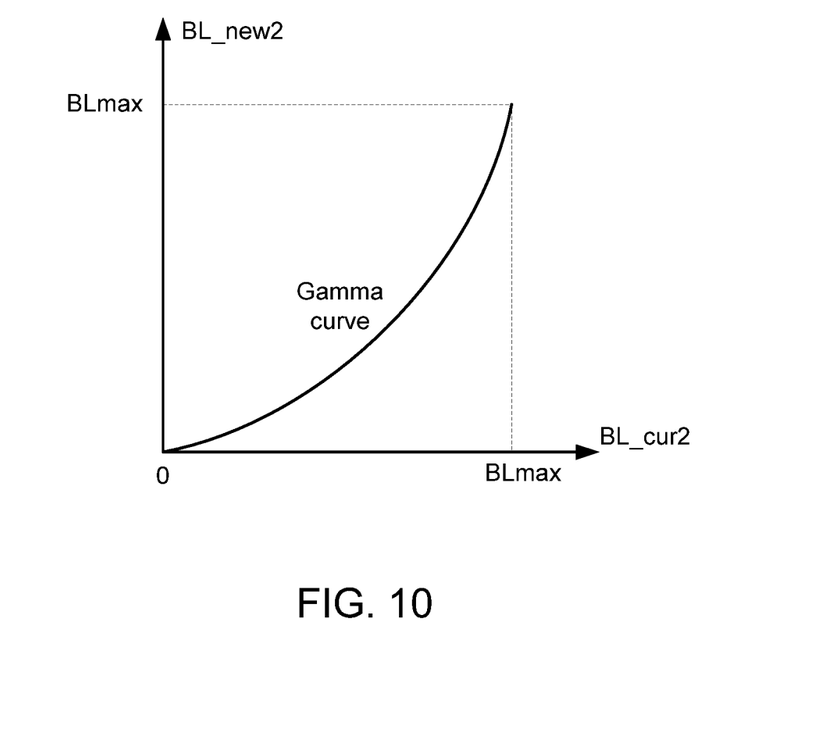
FIG. 10 is a schematic diagram of a gamma curve in step 51 shown in FIG. 9.

That is to say, the gamma curve can be designed and defined in advance according to required display effects, as shown in FIG. 10. Thus, after a processor in a display device acquires the brightness value of each display region, the adjusted brightness value BL_new2 of each display region can be acquired through looking up according to the predetermined gamma curve. The backlight gamma curve adjustment of the embodiment is capable of effectively alleviating the issue of halo, thereby acquiring improved display effects.

Figure 11:
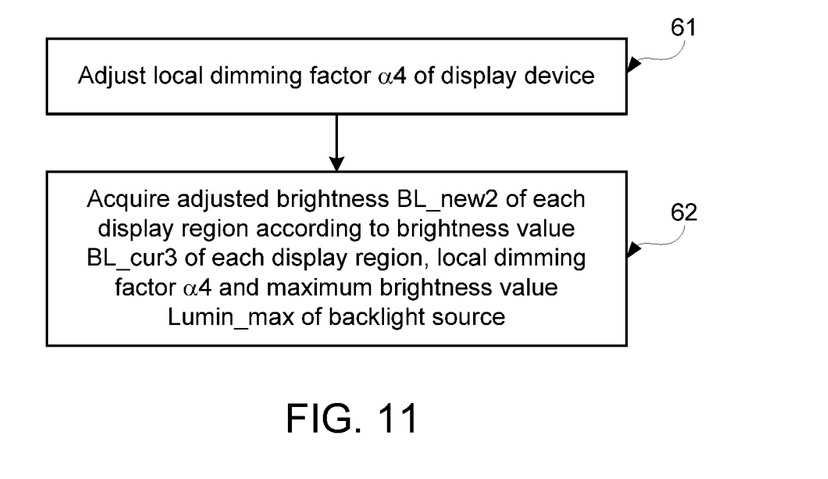
FIG. 11 is a specific flowchart of local dimming strength adjustment of step 12 shown in FIG. 1.

FIG. 11 shows a specific flowchart of local dimming strength adjustment of step 12 shown in FIG. 1. As shown in FIG. 11, when the step of processing and adjusting the brightness value of each display region includes local dimming strength adjustment, step 12 includes the following steps.

In step 61, a local dimming factor α4 of the display device is adjusted.

In step 62, an adjusted brightness value BL_new3 of each display region is acquired according to a brightness value BL_cur3 of each display region, the local dimming factor α4 and a maximum brightness value Lumin_max of a backlight source.

That is to say, during local dimming strength adjustment, the adjusted brightness value of each display region is BL_new3=α4*BL_cur3+(1−α4)*Lumin_max, where the maximum brightness value Lumin_max of the backlight source is determined according to brightness value data, for example, when the precision of the brightness value data is 8 bits, the maximum brightness value Lumin_max of the backlight source is 0xFF.

The local dimming strength adjustment of this embodiment is for controlling the strength of a local dimming function in a display device. The strength of local dimming function increases as the local dimming factor α4 gets larger, and contrarily decreases as the local dimming factor α4 gets smaller. The value of the local dimming factor α4 is determined from a range [0, 1], and can be adjusted according to actual requirements.

Figure 12:
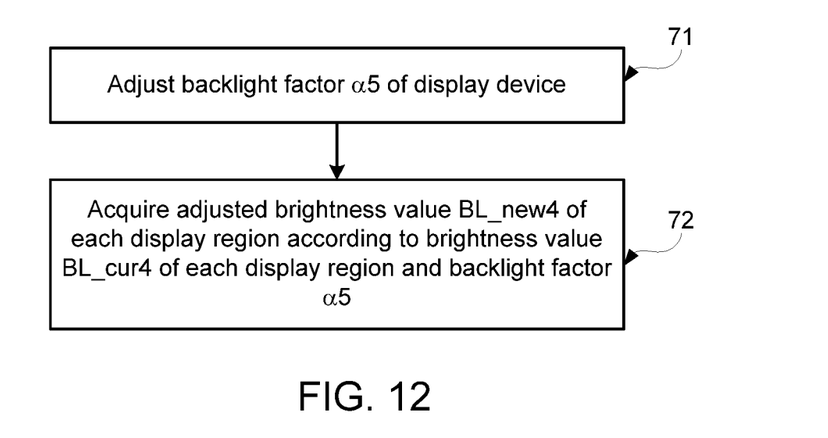
FIG. 12 is a specific flowchart of global dimming strength adjustment of step 12 shown in FIG. 1.

FIG. 12 shows a specific flowchart of global dimming strength adjustment of step 12 shown in FIG. 12. As shown in FIG. 12, when the step of processing and adjusting the brightness value of each display region includes global dimming strength adjustment, step 12 includes the following steps.

In step 71, a backlight factor α5 of the display device is adjusted.

In step 72, an adjusted brightness value BL_new4 of each display region is acquired according to a brightness value BL_cur4 of each display region and the backlight factor α5; that is, BL_new4=α5*BL_cur4.

The global dimming strength adjustment of this embodiment forcibly adjusts the brightness values of all backlight sources in the display device to achieve better display effects. The value of the backlight factor α5 is determined from a range [0, 1] and can be adjusted according to actual requirements, e.g., adjusted according to light intensities of an ambient environment.

Figure 13:
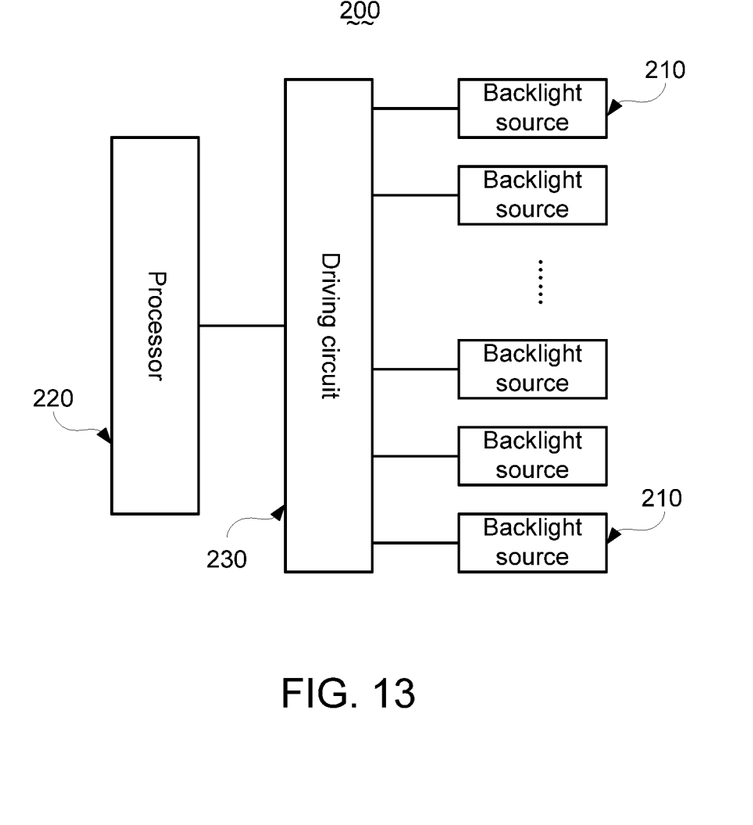
FIG. 13 is a schematic diagram of a display device according to an embodiment of the present invention.

FIG. 13 shows a schematic diagram of a display device according to an embodiment of the present invention. As shown in FIG. 13, a display device according to the embodiment of the present invention includes multiple backlight sources 210, a processor 220 and a driving circuit 230. The multiple backlight sources 210 respectively correspond to multiple display regions of the display device.

The processor 220 reads input image data and acquires a brightness value of each display region, and processes and adjusts the brightness value of each display region to acquire an adjusted brightness value of each display region. More specifically, the processor 220 processes and adjusts the brightness value of each display region through one or more of luminance detector filter adjustment, temporal filter adjustment, spatial filter adjustment, backlight gamma adjustment, local dimming strength adjustment and global dimming strength adjustment described above. Associated details of the adjustment can be referred from the foregoing description and are omitted herein. After various types of processing and adjustment, the processor 220 acquires the final adjusted brightness value of regional dimming of each display region.

The driving circuit 230 is electrically connected to the processor 220 and the multiple backlight sources 210, receives the adjusted brightness value of regional dimming of each display device outputted from the processor, and generates a corresponding driving signal according to the adjusted brightness value of regional dimming of each display device, so as to respectively drive the corresponding backlight sources 210.

In conclusion, in the regional dimming driving method and the display device of the present invention, after the brightness value of each display region is acquired according to input image data, further adjustment and processing are performed on the brightness value of each display region according to requirements, for example, one or more of luminance detection filter adjustment, temporal filter adjustment, spatial filter adjustment, backlight brightness gain adjustment, local dimming strength adjustment and global dimming strength adjustment. With the associated adjustment and processing, issues of backlight flickering and halo can be effectively resolved and brightness compensation can be appropriately performed, thereby providing improved display effects.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A regional dimming driving method for a display device, the display device comprising multiple backlight sources respectively corresponding to multiple display regions of the display device, the regional dimming driving method comprising:
acquiring a brightness value of each of the display regions according to input image data;
processing and adjusting the brightness value of each of the display regions to acquire an adjusted brightness value of each of the display regions; and driving the backlight sources according to the adjusted brightness values of the corresponding display regions, respectively;

wherein processing and adjusting the brightness value of each of the display regions comprises luminance detection filter adjustment, comprising:

acquiring a maximum brightness value and an average brightness value of a display image of each of the display regions according to the image data;

adjusting a weighting coefficient between the maximum brightness value and the average brightness value of the display image of each of the display regions; and acquiring the adjusted brightness value of each of the display regions according to the maximum brightness value, the average brightness value and the weighting coefficient of the display image of each of the display regions.

2. The regional dimming driving method according to claim 1, wherein processing and adjusting the brightness value of each of the display regions comprises temporal filter adjustment, comprising:

acquiring a brightness value of a current frame corresponding to each of the display regions;

acquiring a brightness value of a previous frame corresponding to each of the display regions;

adjusting a weighting coefficient between the brightness value of the previous frame and the brightness value of the current frame corresponding to each of the display regions; and acquiring the adjusted brightness value of each of the display regions according to the brightness value of the current frame, the brightness value of the previous frame and the weighting coefficient corresponding to the each of the display regions.

3. The regional dimming driving method according to claim 2, wherein when the brightness value of the current frame corresponding to the display regions is greater than a predetermined threshold, the weighting coefficient is set to 0.

4. The regional dimming driving method according to claim 1, wherein processing and adjusting the brightness value of each of the display regions comprises spatial filter adjusting, comprising:

acquiring a brightness value of a central display region and a brightness value of a peripheral display region; and performing adjustment according the brightness value of the central display region and the brightness value of the peripheral display region to acquire an adjusted brightness value of the central display region and an adjusted brightness value of the peripheral display region.

5. The regional dimming driving method according to claim 4, wherein performing adjustment according to the brightness value of the central display region and the brightness value of the peripheral display region to acquire the adjusted brightness value of the central display region and the adjusted brightness value of the peripheral display region further comprises:

determining whether the brightness value of the central display region is smaller than the brightness value of the peripheral display region;

when it is determined that the brightness value of the central display region is smaller than the brightness value of the peripheral display region, selecting, between the brightness value of the central display region and the brightness value of the peripheral display region, one having a greater difference from a predetermined threshold, as the adjusted brightness value of the central display region; and conversely, when it is determined that the brightness value of the central display region is not smaller than the brightness value of the peripheral display region, keeping the brightness value of the central display region and the brightness value of the peripheral display region unchanged.

6. The regional dimming driving method according to claim 4, wherein performing adjustment according to the brightness value of the central display region and the brightness value of the peripheral display region to acquire the adjusted brightness value of the central display region and the adjusted brightness value of the peripheral display region further comprises:

determining whether the brightness value of the central display region is greater than the brightness value of the peripheral display region;

when it is determined that the brightness value of the central display region is greater than the brightness value of the peripheral display region, acquiring a weighting coefficient between the brightness value of the central display region and the brightness value of the peripheral display region, and acquiring the adjusted brightness value of the peripheral display region according to the brightness value of the peripheral display region, the brightness value of the central display region and the weighting coefficient; and conversely, when it is determined that the brightness value of the central display region is not greater than the brightness value of the peripheral display region, keeping the brightness value of the peripheral region around the central display region unchanged.

7. The regional dimming driving method according to claim 1, wherein processing and adjusting the brightness value of each of the display regions comprises backlight gamma adjustment, comprising:

performing backlight gamma curve adjustment on the brightness value of each of the display regions to acquire the adjusted brightness of each of the display region.

8. The regional dimming driving method according to claim 1, wherein processing and adjusting the brightness value of each of the display regions comprises local dimming strength adjustment, comprising:

adjusting a local dimming factor of the display device; and acquiring the adjusted brightness value of each of the display regions according to the brightness value of each of the display regions, the local dimming factor and a maximum brightness value of backlight source.

9. The regional dimming driving method according to claim 1, wherein processing and adjusting the brightness value of each of the display regions comprises global backlight strength adjustment, comprising:

adjusting a local dimming factor of the display device; and acquiring the adjusted brightness value of each of the display regions according to the brightness value of each of the display region and a backlight factor.

10. A display device, comprising:

multiple backlight sources, respectively corresponding to multiple display regions of the display device;

a processor, reading input image data, acquiring a brightness value of each of the display regions according to the image data, and processing and adjusting the brightness value of each of the display regions to acquire an adjusted brightness value of each of the display regions; and a driving circuit, electrically connected to the processor and the multiple backlight sources, receiving the brightness value of each of the display regions, and generating a corresponding driving signal according to the adjusted brightness value of each of the display regions, so as to respectively drive the multiple backlight sources;

wherein the processor processing and adjusting the brightness value of each of the display regions to acquire an adjusted brightness value of each of the display regions comprises luminance detection filter adjustment, comprising:

acquiring a maximum brightness value and an average brightness value of a display image of each of the display regions according to the image data;

adjusting a weighting coefficient between the maximum brightness value and the average brightness value of the display image of each of the display regions; and acquiring the adjusted brightness value of each of the display regions according to the maximum brightness value, the average brightness value and the weighting coefficient of the display image of each of the display regions.

11. The display device according to claim 10, wherein the processor processing and adjusting the brightness value of each of the display regions comprises temporal filter adjustment, comprising:

acquiring a brightness value of a current frame corresponding to each of the display regions;

acquiring a brightness value of a previous frame corresponding to each of the display regions;

adjusting a weighting coefficient between the brightness value of the previous frame and the brightness value of the current frame corresponding to each of the display regions; and acquiring the adjusted brightness value of each of the display regions according to the brightness value of the current frame, the brightness value of the previous frame and the weighting coefficient corresponding to the each of the display regions.

12. The display device according to claim 11, wherein when the brightness value of the current frame corresponding to the display regions is greater than a predetermined threshold, the weighting coefficient is set to 0.

13. The display device according to claim 10, wherein the processor processing and adjusting the brightness value of each of the display regions comprises spatial filter adjusting, comprising:

acquiring a brightness value of a central display region and a brightness value of a peripheral display region; and performing adjustment according the brightness value of the central display region and the brightness value of the peripheral display region to acquire an adjusted brightness value of the central display region and an adjusted brightness value of the peripheral display region.

14. The display device according to claim 13, wherein the processor performing adjustment according to the brightness value of the central display region and the brightness value of the peripheral display region to acquire the adjusted brightness value of the central display region and the adjusted brightness value of the peripheral display region further comprises:

determining whether the brightness value of the central display region is smaller than the brightness value of the peripheral display region;

when it is determined that the brightness value of the central display region is smaller than the brightness value of the peripheral display region, selecting, between the brightness value of the central display region and the brightness value of the peripheral display region, one having a greater difference from a predetermined threshold, as the adjusted brightness value of the central display region; and conversely, when it is determined that the brightness value of the central display region is not smaller than the brightness value of the peripheral display region, keeping the brightness value of the central display region and the brightness value of the peripheral display region unchanged.

15. The display device according to claim 13, wherein performing adjustment according to the brightness value of the central display region and the brightness value of the peripheral display region to acquire the adjusted brightness value of the central display region and the adjusted brightness value of the peripheral display region further comprises:

determining whether the brightness value of the central display region is greater than the brightness value of the peripheral display region;

when it is determined that the brightness value of the central display region is greater than the brightness value of the peripheral display region, acquiring a weighting coefficient between the brightness value of the central display region and the brightness value of the peripheral display region, and acquiring the adjusted brightness value of the peripheral display region according to the brightness value of the peripheral display region, the brightness value of the central display region and the weighting coefficient; and conversely, when it is determined that the brightness value of the central display region is not greater than the brightness value of the peripheral display region, keeping the brightness value of the peripheral region around the central display region unchanged.

16. The display device according to claim 10, wherein the processor processing and adjusting the brightness value of each of the display regions comprises backlight gamma adjustment, comprising:

performing backlight gamma curve adjustment on the brightness value of each of the display regions to acquire the adjusted brightness value of each of the display regions.

17. The display device according to claim 10, wherein the processor processing and adjusting the brightness value of each of the display regions comprises local dimming strength adjustment, comprising:

adjusting a local dimming factor of the display device; and acquiring the adjusted brightness value of each of the display regions according to the brightness value of each of the display regions, the local dimming factor and a maximum brightness value of the backlight source.

18. The display device according to claim 10, wherein the processor processing and adjusting the brightness value of each of the display regions comprises global backlight strength adjustment, comprising:

adjusting a local dimming factor of the display device; and acquiring the adjusted brightness value of each of the display regions according to the brightness value of each of the display region and a backlight factor.

\* \* \* \* \*